Oct. 9, 1928.
D. E. ROSS
1,687,259
MACHINE FOR MAKING ACTUATED MEMBERS FOR STEERING GEARS
Filed March 26, 1924    3 Sheets-Sheet 1
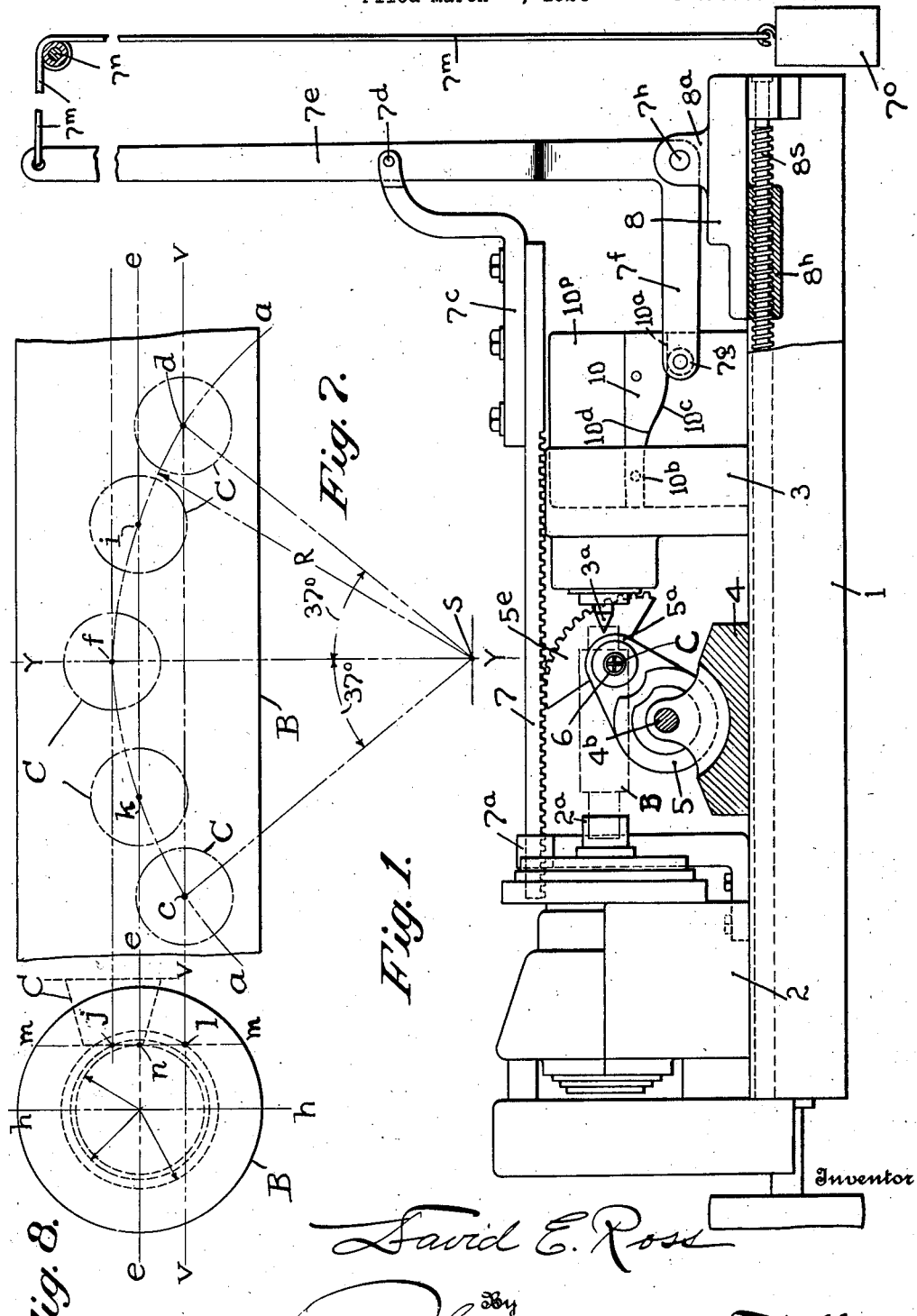

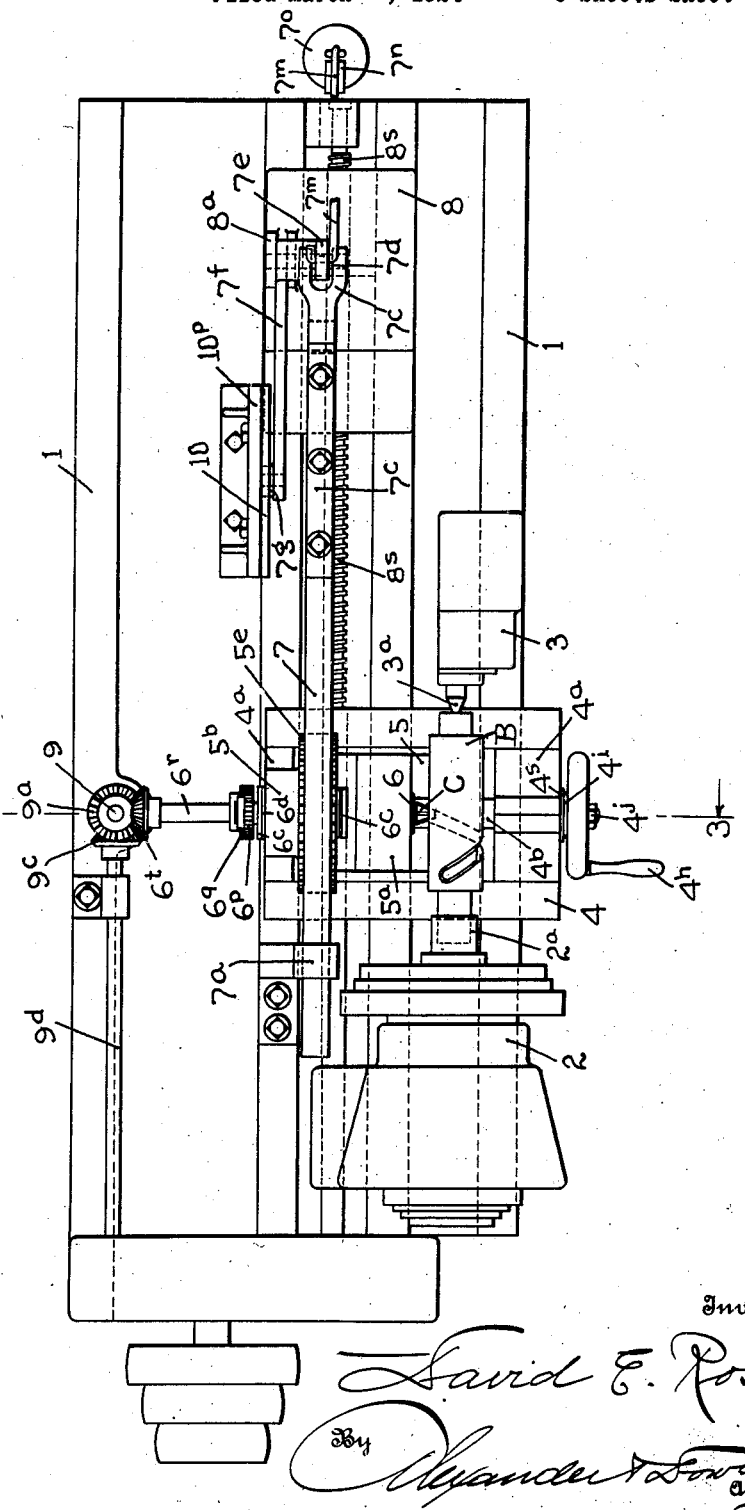

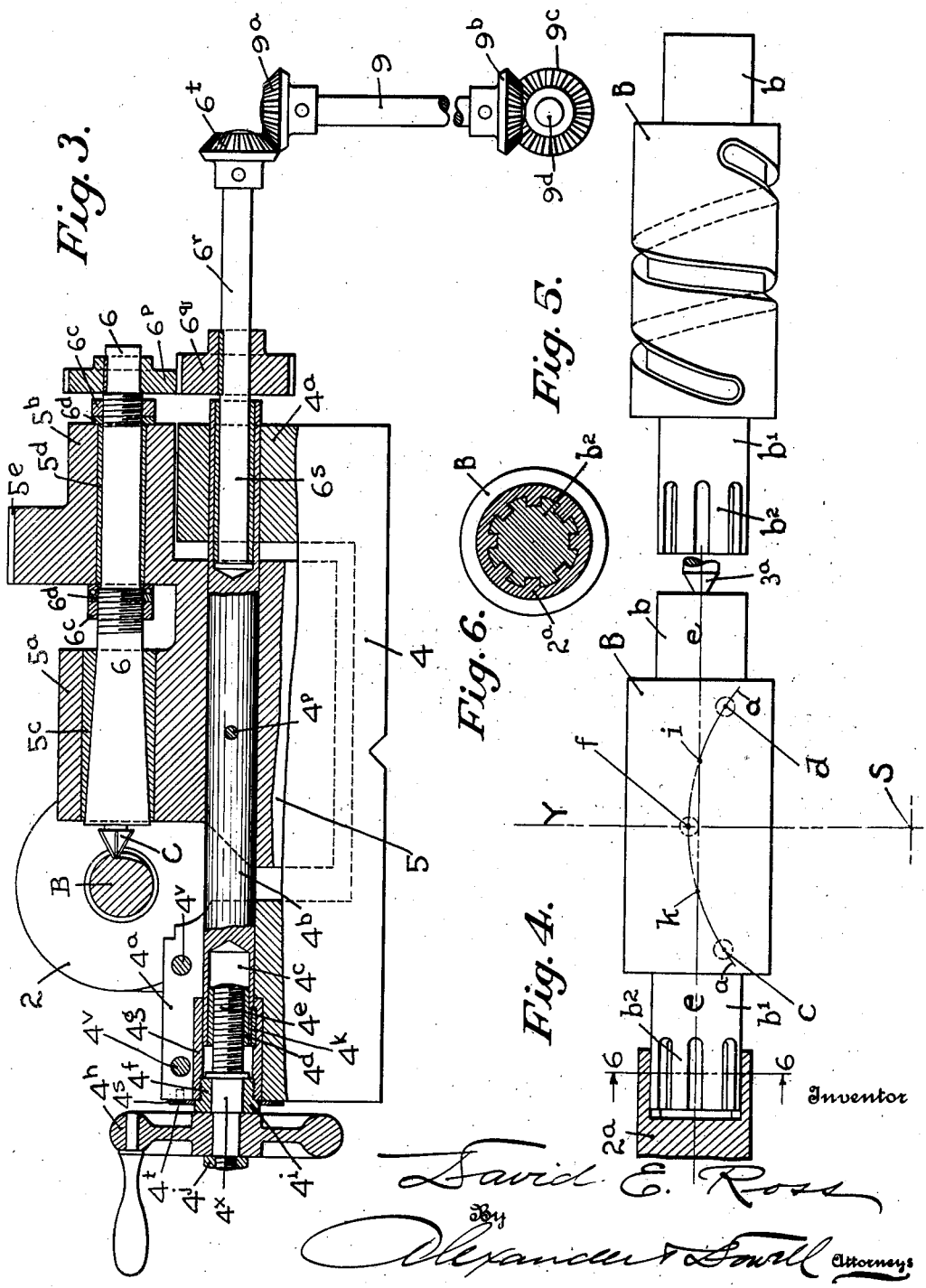

Patented Oct. 9, 1928.

1,687,259

UNITED STATES PATENT OFFICE.

DAVID E. ROSS, OF LA FAYETTE, INDIANA, ASSIGNOR TO ROSS GEAR & TOOL COMPANY, OF LA FAYETTE, INDIANA, A CORPORATION OF INDIANA.

MACHINE FOR MAKING ACTUATING MEMBERS FOR STEERING GEARS.

Application filed March 26, 1924. Serial No. 702,067.

This invention is a novel machine for cutting variable helical grooves in the actuating members of steering gears of the type shown in my application filed September 5, 1922, Serial No. 586,145.

Such actuating members are cylindrical bodies provided with one or more helical grooves, each groove varying in pitch from its lineal center towards each end thereof. The helical groove in such actuating member is adapted to be engaged by an arm (or a pin on the arm) of a rocker shaft disposed at right angles to such member, whereby rotation of such actuating member on its axis will impart a variable rocking movement to said rocker shaft; the relative movements of the actuating member and rocker shaft varying with and according to the point of engagement of the arm with the groove.

The groove in the actuating member must be made with extreme accuracy, and the method of cutting such groove in the actuating members forms the subject matter of my companion application filed December 31, 1923, Serial No. 683,679.

In the accompanying drawings I have illustrated so much of a novel machine for grooving such actuating members as will suffice to impart a complete understanding of the present invention; and I will describe the invention with reference to the said drawings to enable others to understand and use the same. In the claims I have enumerated the essentials of the invention, and novel combinations of parts, and novel features of construction, for all of which protection is desired.

In said drawings:

Figure 1 is a front elevation of a machine for cutting varying helical grooves in actuating members of steering gears.

Fig. 2 is a top plan view thereof.

Fig. 3 is a sectional view on line 3—3, Fig. 2.

Fig. 4 is a diagrammatic view illustrating the method of grooving an actuating member blank.

Fig. 5 is a detail view of one of the grooved actuating members.

Fig. 6 is a detail section on the line 6—6, Fig. 4.

Figs. 7 and 8 are diagrams illustrating various relative positions of the blank and cutter during the cutting operation.

The machine, as shown, comprises a base or table 1 on which the operable parts are mounted, which base may be of any suitable construction, such for instance as the base of an ordinary thread miller. On the base are supported a head stock 2 and tail stock 3, which may be adjustably mounted on the base, if desired, in the usual manner. The blank from which the actuating member is to be cut is indicated at B in the drawings, and is mounted between a center $3^a$ on tail stock 3 and a center $2^a$ on head stock 2, in the usual manner of mounting metal objects in a thread miller.

On the table 1 is a tool carrier 4 which may be slidably mounted in any suitable way and when adjusted can be clamped in place by any suitable means. Said tool carrier 4 is arranged intermediate the stocks 2 and 3, and is provided at opposite ends with upstanding lugs $4^a$ which are bored for the reception of a shaft $4^b$. Shaft $4^b$ has a socket $4^c$ in one end in which is secured a threaded member $4^d$, which is engaged by the threaded end $4^e$ of a spindle $4^x$ which is journaled in a bushing $4^f$ tapped into a sleeve $4^g$ fitted in the outer end of one of the bearings $4^a$, concentric with the shaft $4^b$.

The inner end of sleeve $4^g$ is fitted to the adjacent end of the shaft $4^b$, and is preferably keyed thereto as at $4^k$, so that shaft $4^b$ and sleeve $4^g$ can rotate together as a unit; longitudinal play of sleeve $4^g$ is prevented by any suitable means, a ring $4^s$ being indicated in Fig. 3 as fitted against the outer end of the sleeve and secured to the lug $4^a$ by screws $4^t$.

To spindle $4^x$ is attached a hand wheel $4^h$ by which the threaded end $4^e$ thereof can be turned so as to adjust shaft $4^b$ longitudinally of the tool carrier 4. Longitudinal play of the spindle $4^x$ relative to the support may be prevented by a collar $4^i$ on the spindle, which is closely held against the outer end of the bushing $4^g$ by a nut $4^j$ on the outer end of the spindle, as shown in Fig. 3.

A tool carrying member 5 is mounted on the shaft $4^b$ between the upstanding lugs $4^a$, said member 5 being pinned to the shaft as at $4^p$ in Fig. 3. Member 5 is provided with two projections $5^a$, $5^b$, extending above the shaft $4^b$ and which are axially bored for the reception of bushings $5^c$ and $5^d$, in which a cutting-tool holder 6 is rotatably mounted. The carrier 5 may be adjusted longitudinally of the support 4 by turning the hand wheel $4^h$ which turns the spindle $4^x$ and moves the shaft $4^b$ and carrier 5 bodily longitudinally of the shaft. As shown the lug $4^u$ in which sleeve $4^g$ is mounted is longitudinally split and may be clamped upon the sleeve by through-bolts indicated at $4^v$ in Fig. 3.

The cutting-tool holder 6 is shown as secured in position by locking nuts $6^c$ screwed onto the shank of the tool at opposite sides of the projection $5^b$, and suitable washers $6^d$ (which may be ball thrust bearings if desired) are positioned between the nuts $6^c$ and the part $5^b$ as shown. This enables the cutting tool to be securely adjusted, and takes care of the end thrust thereon. To the inner end of holder 6 is secured a cutter head C, which is adapted to cut the groove in the blank as hereinafter explained.

On the rear end of the cutting-tool holder 6 is a pinion $6^p$ which meshes with a pinion $6^q$ on a spindle $6^r$, the front end of which is journaled in an axial bore in the rear end of the shaft $4^b$, as indicated at $6^s$, in Fig. 3. This shaft $6^r$ has a bevel pinion $6^t$ on its outer end which meshes with a bevel gear $9^a$ on a shaft 9, which shaft carries a gear $9^b$ on its lower end meshing with a bevel gear $9^c$ on a shaft $9^d$ extending longitudinally of the machine and driven by any suitable means such as reducing gearing from the main drive shaft. The gear $6^q$ is of sufficient width to permit the cutter C to be advanced to or from the work without disengaging the gear $6^p$ from the gear $6^q$.

The tool carrier 5 is adjustable longitudinally of the member 4, as above described, and is also capable of swinging in an arc transversely of said member 4. To control the swinging movement of tool carrier 5 a gear segment $5^e$ is formed on or rigidly attached to part $5^b$, concentric with shaft $4^b$; and said segment $5^e$ is meshed with a rack bar 7 having an end mounted in a suitable guide $7^h$ on the machine.

The other end of the rack 7 is attached to one end of an angle bar $7^c$ (see Fig. 1), the other end of which is pivotally connected at $7^d$ to the long arm $7^e$ of a bell crank lever which is pivoted at its bend on a pin $7^b$ attached to a lug $8^a$ on a slide 8, mounted on the frame, and adapted to be moved longitudinally thereof toward or from the support 4 as hereinafter explained.

The lever $7^e$ is controlled by a suitable cam so that when the slide 8 is reciprocated, thereby moving lever $7^e$ toward or from the support 4, it reciprocates the rack bar 7 which turns gear segment $5^e$ and rocks the member 5, the cam giving a predetermined desired movement which may be variable, which may be constant, or may be a combination of varying or constant movement to the rack as hereinafter explained.

In the construction shown, an arm $7^f$ is attached to arm $7^e$ and carries a roller $7^g$ which engages a cam plate 10 on a bracket $10^p$ fixedly fastened to the frame. The cam 10 is preferably formed of a bar having its under surface shaped to form a cam which is engaged by the roller $7^g$. The cam surface of bar 10 has a lower portion $10^a$ and a higher portion $10^b$ connected by reversely inclined merging cam portions $10^c$ and $10^d$, so that any predetermined desired movement (preferably a variable movement) is imparted to rack 7 as slide 8 is reciprocated, and while the milling tool C is cutting a groove in the actuating member as hereinafter explained.

The slide 8 may be reciprocated by any suitable means; preferably by a screw $8^s$ extending longitudinally of the frame 1 and engaging an internally threaded part $8^h$ of the slide 8; and suitable means is provided whereby the screw 8 may be rotated first in one direction and then in the other, at suitable speeds, and at proper times, so as to cause the slide 8 to move the lever $7^e$ and rack 7 in one direction during the operation of cutting a groove in the actuating member blank, and to then retract said lever and bar after the blank has been grooved; and preparatory to cutting a groove in another blank.

The screw $8^s$ may be operated from the spindle in the head stock by any suitable means such for instance as are commonly used in thread cutting machines; such for example as in the Pratt & Whitney thread cutting machines; and will be readily understood by those familiar with the art. The lead screw being made to advance the slide 8 any desired distance per turn of the spindle in the head stock.

To prevent any chatter of the arm $7^f$ the roller $7^g$ on arm $7^f$ of lever $7^e$ must be continually held in close contact with the cam during the operation of cutting the master cam. A spring might be employed, but preferably a chain or cable $7^m$ is attached to the upper end of lever $7^e$ and led to and over a pulley $7^n$, and a weight $7^o$ is attached to the depending end of the cable; this weight plus the leverage exerted by lever $7^e$ on arm $7^f$ is sufficient to hold roller $7^g$ in close contact with the surface of the cam 10 at all times.

The extent of reciprocal movement of the slide 8 is sufficient to cause rack bar 7 to turn the tool holder 5 approximately 70° for each complete forward or backward stroke of the slide 8; and thus cause the cutter C to swing laterally through an arc of 70° for each stroke of the rack bar 7.

The cutter C is preferably a milling cutter made of the highest grade cutting steel and preferably corresponds exactly in exterior form to a cross section of the groove to be cut in the actuating member.

The blank B for the actuating member is preferably made of suitable steel and has a truly cylindric body portion of the proper length and diameter, and is preferably provided with trunnions $b$ and $b'$ at its opposite ends by which it can be rotatably mounted in the machine or gear in which the finished master actuating member is to be used.

Preferably the trunnion $b'$ is longer than trunnion $b$ and is provided at its outer end with a peripheral series of parallel longitudinal grooves or splines $b^2$ which are adapted to engage a corresponding internally grooved socket in a center piece $2^a$ attached to the head 2, in place of the ordinary point center, so that when such a blank is placed in the machine with its grooved trunnion $b^2$ engaged with the center $2^a$ and its trunnion $b$ engaged with the center $3^a$ it will be properly positioned in the machine and truly and accurately centered between the stocks 2 and 3, and will be caused to rotate with and by the center $2^a$.

It will be seen by reference to Figs. 4 and 7, that in cutting the blank cutter C traverses an arc indicated by line $a$—$a$ in Figs. 4 and 7, which arc extends longitudinally of the blank in the plane $m$—$m$, Fig. 8, and the cutter moves on said arc in a plane at right angles to the axis of shaft $4^b$ indicated at S in Figs. 4 and 7.

As stated the machine shown is designed for cutting variable spiral grooves in actuating members of steering gears in automobiles. Such steering gears are shown in my Patent #1,567,997, dated December 29, 1925. In the drawings (Figure 7) S would represent the axis of the rocker shaft, the radial line R would represent the arm of the rocker shaft, and the circle C (Figure 7) would represent the pin on said arm, but an actual steering gear is not illustrated in the drawings. Assuming that the pin on the arm of the rocker shaft is to have no longitudinal motion while traversing the arc or the groove in the actuating member, no longitudinal motion of the cutter would be required during the cutting operation.

At the extremes of its lateral movements by the holder 5 the axis of the cutter C would lie below the plane of the axis of the blank B mounted between the centers $2^a$, $3^a$, as indicated at $c$ and $d$ in Figs. 4 and 7. At the center portion of its movement the axis of the cutter, would be above the plane of the axis of the blank, as indicated at $f$ in Figs. 4 and 7.

The diagrams, Figs. 7 and 8, illustrate various relative positions assumed by the cutter C and the cam blank in the cutting operation. In Figure 7 the line Y—S intersects the axis of the rocker shaft (which axis is indicated at S) and line Y—S indicates the mid position of the arm on the rocker shaft which carries the pin that engages the groove in the actuating member. Figures 7 and 8 also illustrate the varying depth of the spiral groove cut in the actuating member. At the extreme positions indicated at $c$—$d$ and the central position indicated at $f$, the cutter will not enter as deeply into the blank as at the positions indicated at $k$, $i$. As indicated in Fig. 7 as the cutter C moves longitudinally of the blank it traverses a plane $m$—$m$ (Fig. 8), which is at right angles to the center line of the rocker shaft (indicated at S in Fig. 7) and which plane is parallel with a plane containing the axis of the blank which plane is indicated by the line $h$—$h$ Fig. 8, and is perpendicular to the plane of the axis of the cutter. At the extreme ends of the movement of the cutter longitudinally of the blank (in the positions indicated at $c$—$d$ in Fig. 7) the bottom of the groove is farthest from the center of the cylinder, as indicated at $l$ in Fig. 8. At the points $k$ and $i$ Fig. 7 the end of the cutter C, moving in the plane $m$—$m$, crosses the maximum diameter or axial line $e$—$e$ of the blank and the bottom of the groove would be nearest the axis of the cam as indicated at $n$ in Fig. 8. At the point $f$ Fig. 7 (the central position) the bottom of the groove is slightly farther away from the axis of the cam than at the points $k$, $i$, as indicated at $j$ in Fig. 8. In other words the groove is of corresponding depth at the intermediate points $k$—$i$, is of slightly less depth at the center point $f$ and is of the least depth at the extreme points $c$—$d$.

The cutter C corresponds to the pin which is attached to the rocker shaft of the cam, and said pin will of course exactly follow the groove made by the cutter; and the pin therefore will be most deeply engaged with the groove at the points $k$, $i$ where as a matter of fact the strain would ordinarily be greatest.

*Operation.*

When the machine is ready for operation the cutter C should be retracted out of the path of the blank B by properly adjusting shaft $4^b$ before the blank B is placed between the centers $2^a$, $3^a$. The slide 8 first retracted, say to the right, as in Fig. 1, so that the cutter C will be in line with the point $c$, Figs. 4 and 7, and below the axis of the blank B, which is mounted between the centers $2^a$, $3^a$.

After the blank B is properly mounted between the centers $2^a$, $3^a$, the cutter C is revolved and the blank B is held stationary between the centers while the operator advances the cutter C toward the blank, by turning shaft $4^b$, until the cutter has been entered to the proper depth in the blank. In the machine shown the cutter is initially entered into the blank at a point a little below the plane of the axis of the blank as indicated at c in Figs. 4 and 7.

To facilitate entering the cutter into the blank a suitable hole may be drilled in the blank before it is placed between the centers. During the initial operation of entering the cutter C into the blank, the blank is held stationary and the slide 8 is also held stationary.

After the cutter has been properly entered into the blank the cutter is continuously rotated at the proper speed, and the operator then simultaneously starts the mechanisms which rotate the lead screw $8^s$; and the mechanism which rotates the center $2^a$ which turns the blank. The cutter C is driven continuously at the proper speed; and both the screw $8^s$ and the blank B are turned very slowly at predetermined relative speeds and due to the combined effects of the two motions the cutter C cuts a helical groove in the face of the cylindrical blank B as it moves from the point c to the point d (Figs. 4 and 7) and the pitch of this helical groove is continually varied from center f to each end c, d by the action of the cam 10 on the rack 7.

If the rack 7 was moved absolutely in unison with the slide 8 the cutter C would be moved substantially uniformly from the point c to the point d (Figs. 4 and 7). As the slide 8 moves inwardly, however, the roller $7^g$ begins to traverse the part $10^c$ of the cam 10 and permits the arm $7^f$ to gradually slightly rise, and this causes a variant retardation of the movement of the rack bar 7 relative to the slide 8, resulting in the rack bar 7 moving increasingly more slowly than the slide 8, while the roller $7^g$ is traversing the part $10^c$ of the cam up to the neutral point of the cam. The part $10^c$ of the cam is traversed by the roller $7^g$ while the cutter C is moving from the point c to the point f Fig. 7. The roller $7^g$ then immediately begins to traverse the part $10^d$ of the cam, and there is gradually accelerated movement of the rack 7 relative to the movement of the slide 8, during which time the cutter C moves from the point f to the point d and while the roller $7^g$ of arm $7^f$ is moving from the mid point over the part $10^d$ of the cam.

As stated there is a gradually lessening movement of the rack 7 relative to slide 8 as the cutter moves from the point c to the point f, and there is a gradually increasing movement of the rack 7 relative to slide 8 as the cutter moves from the point f to the point d. Meanwhile the blank B has been turned the desired degrees of revolution during the time the cutter is moving from points c to d. The degree of turning of the blank B during the cutting of the groove depends on the size of gear, and is approximately as follows: For the smallest size gear the blank would be turned 540°, for the next larger size 630°, next larger size 720°, next larger size 810°, and next larger size 900°.

In the example shown, the blank B is supposed to be rotated at a uniform speed during the cutting operation with the result that the helical groove cut in the blank (see Fig. 5) has a pitch of practically 90° to the axis of the blank at its center (or where the cutter is at the point f, Fig. 7), and the pitch of such groove gradually increases from the center f (see Fig. 7) of the groove to each end thereof, being of the highest pitch at its ends c and d.

The same result might be produced if a variable rotation was given to the blank and the cutter was moved at uniform speed through its arc, but the rate of feed on the stock would have to be increased to accomplish this; if the starting feed were the maximum the cutter could take, then the feed in mid position would be too great for smooth cutting and might injure the cutting tool. On the other hand, if feed at start were slow and increased to maximum at center then cutting time would probably be too slow.

It is obvious that various modifications may be made in the construction of the machine within the scope of the invention; and various mechanical devices or expedients may be used for producing the necessary and desired relative arcuate movements of the cutter and the blank, and the rotatorial movement of the blank relative to the cutter, during the cutting operation to produce the varying spiral groove in the blank. I therefore do not consider my invention limited to the specific constructions shown. In my companion application #683,679, the method is claimed broadly. In the present application I desire to protect the invention as set forth in the claims.

What I claim is:

1. In a machine for cutting helical grooves; means for holding a blank; a rotatable cutter; and means for so relatively moving the cutter and blank that the cutter traverses with varying speed an arc extending longitudinally of the blank, whereby a groove is cut in the blank, said groove being of the greatest depth at points intermediate its central point and each end thereof and gradually lessening in depth from said points toward each end of the groove.

2. In a machine for cutting helical grooves in cylindric blanks; means for holding a blank; a cutter; means whereby the cutter is rotated; means for entering the cutter into the blank; and means whereby after the cutter is entered such relative movement is produced between the cutter and blank that the cutter is moved laterally at varying speed on an arc extending longitudinally of the cam blank, but without linear movement to or from the blank and in a plane parallel with the axis of the blank, whereby a helical groove is cut in the blank, said groove being of greatest depth at points intermediate its central point and each end thereof, and gradually lessening in depth from each of said points toward each end of the groove.

3. In a machine for cutting variable helical grooves; means for holding a blank; a rotatable cutter; and means for moving the cutter at varying speed in an arc extending longitudinally of the blank, and in a plane to one side of and parallel with the axis of the blank whereby a varying helical groove is cut in the blank, said groove being of the greatest depth at points intermediate its central point and each end thereof and gradually lessening in depth from said points toward each end of the groove.

4. In a machine for cutting variable helical grooves in cylindric blanks; means for holding the blank; a cutter, means whereby the cutter is rotated; means for entering the cutter into the blank; and means whereby, after the cutter is entered the cutter is moved laterally at varying speed on an arc extending longitudinally of the cam blank, but without linear movement to or from the blank and in a plane parallel with the axis of the blank, whereby a varying helical groove is cut in the blank, and said groove being of greatest depth at points intermediate its central point and each end thereof, and gradually lessening in depth from each of said points toward each end of the groove.

5. In a machine for cutting variable helical grooves in cylindric blanks; means for holding and axially rotating a blank, a slide arranged at approximately right angles to the axis of the blank; a rocking support mounted on said slide, a holder rotatably mounted in said support, a cutter, means for advancing the cutter toward the blank to seat the cutter therein to the proper depth prior to cutting the groove; means whereby during the cutting operation the cutter is rotated on its own axis; and means whereby during the cutting operation the support is rocked to move the cutter with varying speed on an arc longitudinally of the blank, whereby a varying helical spiral groove is cut in the blank.

6. In a machine for cutting helical grooves in cylindric blanks; means for holding and slowly rotating a blank, a slide movable at right angles to the axis of the blank, a rocking support on said slide, a tool holder rotatably mounted on said support and carrying a cutter, means for rotating such holder, and means whereby the support is first moved to sink the cutter into the blank, and then rocked so as to move the cutting tool laterally on an arc extending longitudinally of the blank during the cutting operation, and at varying speed so that it is moved laterally with gradually decreasing speed from a position adjacent one end of the blank to a point adjacent the center of the blank, and with gradually increasing speed from the center point of the blank towards the other end thereof, substantially as described.

7. In a machine for cutting helical grooves in cylindric blanks, means for holding a blank, a tool support arranged at approximately right angles to the axis of the blank, a cutter rotatably mounted in said support, means for rotating the cutter, means for causing the cutter to seat in the blank prior to cutting the groove; a segment attached to said support, a rack bar engaging said segment, and means whereby the rack bar is moved at varying speed to cause the cutter to move longitudinally of the blank after it has been seated in the blank, substantially as described.

8. In a machine for cutting variable helical grooves in cylindric blanks, means for holding a blank, a tool support arranged at approximately right angles to the axis of the blank, a cutter rotatably mounted in said support, means for causing the cutter to seat in the blank, means whereby the cutter is rotated; a segment attached to said support, a rack bar engaging said segment, and means whereby the rack bar is moved with varying speed to cause the cutter to move longitudinally of the blank at varying speed, whereby a varying helical groove is cut in the blank, substantially as described.

9. In a machine for cutting helical grooves in cylindric blanks; means for holding a blank, a slide arranged at approximately right angles to the axis of the blank, a rocking support mounted on said slide, a tool holder rotatably mounted in said support, a cutter, means for advancing the cutter toward the blank to seat the cutter therein to the proper depth; means whereby during the cutting operation the cutter is rotated on its own axis, a segment attached to said support, a rack bar engaging said segment, and cam controlled means whereby the rack bar is moved to cause the cutter to move longitudinally of the blank.

10. In a machine for cutting variable helical grooves in cylindric blanks; means for holding a blank, a slide arranged at approximately right angles to the axis of the blank, a rocking support mounted on said slide, a tool holder rotatably mounted in said support, a cutter, means for advancing the cutter toward the blank to seat the cutter therein to the proper depth; means whereby during the cutting operation the cutter is rotated on its own axis, a segment attached to said support, a rack bar engaging said segment, and cam controlled means whereby the rack bar is moved with varying speed to cause the cutter to move longitudinally of the blank at varying speed, whereby a varying helical groove is cut into the blank, substantially as described.

11. In a machine for cutting helical grooves in cylindric blanks, means for holding and axially rotating a blank, a tool support arranged at approximately right angles to the axis of the blank, a tool holder rotatably mounted in said support, a cutter attached to said holder, means for advancing the holder lineally toward the blank to cause the cutter to seat in the blank, means whereby during the cutting operation the tool is rotated on its own axis; a segment attached to said support, a rack bar engaging said segment, and cam controlled means whereby the rack bar is moved to cause the cutter to move longitudinally of the blank.

12. In a machine for cutting variable helical grooves in cylindric blanks, means for holding and axially rotating a blank, a tool support arranged at approximately right angles to the axis of the blank, a tool holder rotatably mounted in said support, a cutter attached to said holder, means for advancing the holder lineally toward the blank to cause the cutter to seat in the blank, means whereby during the cutting operation the tool is rotated on its own axis; a segment attached to said support, a rack bar engaging said segment, and cam controlled means whereby the rack bar is moved with varying speed to cause the cutter to move longitudinally of the blank at varying speed, whereby a varying helical groove is cut in the blank, substantially as described.

13. In a machine for cutting helical grooves in cylindric blanks; means for holding and axially rotating a blank, a slide arranged at approximately right angles to the axis of the blank, a rocking support mounted on said slide, a tool holder rotatably mounted in said support, a cutter, means for advancing the cutter toward the blank to seat the cutter therein to the proper depth prior to cutting the groove; means whereby during the cutting operation the tool is rotated on its own axis, a segment attached to said support, a rack bar engaging said segment, means for moving the rack bar lineally at varying speed to cause the cutter to move longitudinally of the blank, whereby a groove is cut in the blank, substantially as described.

14. In a machine for cutting variable helical grooves in cylindric blanks; means for holding and axially rotating a blank, a slide arranged at approximately right angles to the axis of the blank, a rocking support mounted on said slide, a tool holder rotatably mounted in said support, a cutter, means for advancing the cutter toward the blank to seat the cutter therein to the proper depth; means whereby during the cutting operation the cutter is rotated on its own axis, a segment attached to said support, a rack bar engaging said segment, means for moving the rack bar lineally, and cam controlled means whereby the speed of movement of the rack bar is varied, causing the cutter to move longitudinally of the blank at varying speed, whereby a varying helical groove is cut into the blank, substantially as described.

15. In a machine for cutting helical grooves in cylindric blanks; means for holding a blank, a slide arranged at approximately right angles to the axis of the blank, a support mounted on said slide, a tool holder rotatably mounted in said support, a cutter, means for advancing the cutter toward the blank to seat the cutter therein to the proper depth; and means whereby during the cutting operation the cutter is rotated on its own axis; with a segment attached to said support; a rack bar engaging said segment, means for reciprocating the rack bar and cam means whereby a variable motion is imparted to said rack bar as it is reciprocated, whereby during the cutting operation the support is moved longitudinally of the blank, and the cutter cuts a helical groove in the blank.

16. In a machine for cutting helical grooves in cylindric blanks; means for holding and axially rotating a blank, a slide arranged at approximately right angles to the axis of the blank, a rocking support mounted on said slide; a tool holder rotatably mounted in said support; a cutter, means for advancing the cutter toward the blank to seat the cutter therein to the proper depth; means whereby during the cutting operation the tool is rotated on its own axis, a segment attached to said support; a reciprocable rack bar engaging said segment, means for reciprocating the rack bar, and cam means whereby a variable motion is imparted to said rack bar as it is reciprocated, whereby during the cutting operation the support is rocked to move the cutter on an arc longitudinally of the blank, and a helical groove is cut in the blank.

17. In a machine for cutting helical grooves in cylindric blanks; means for holding a blank, a slide arranged at approximately right angles to the axis of the blank, a rocking support mounted on said slide, a tool holder rotatably mounted in said support; a cutter, means for advancing the cutter toward the blank to seat the cutter therein to the proper depth; means whereby during the cutting operation the cutter is rotated on its own axis; a segment attached to said support; a reciprocable rack bar engaging said segment; a lever connected with said rack bar; an arm connected with said lever; a slide on which the lever is pivotally mounted; means for operating the slide to reciprocate the lever and rack bar, whereby during the cutting operation the support is rocked to move the cutter longitudinally of the blank, and a helical groove is cut in the blank.

18. In a machine for cutting variable helical grooves in cylindrical blanks; means for holding a blank, a slide arranged at approximately right angles to the axis of the blank, a rocking support mounted on said slide, a tool holder rotatably mounted in said support; a cutter, means for advancing the cutter toward the blank to seat the cutter therein to the proper depth; means whereby during the cutting operation the cutter is rotated on its own axis; a segment attached to said support; a reciprocable rack bar engaging said segment; a lever connected with said rack bar; an arm connected with said lever; a slide on which the lever is pivotally mounted mounted; means for operating the slide to reciprocate the lever and rack bar, and means to vary the motion of said rack bar as it is reciprocated; whereby during the cutting operation the support is rocked to move the cutter on an arc longitudinally of the blank, and a varying helical groove is cut in the blank.

19. In a machine for cutting variable helical grooves in cylindric blanks; means for holding and axially rotating a blank, a slide arranged at approximately right angles to the axis of the blank, a rocking support mounted on said slide; a tool holder rotatably mounted in said support; a cutter, means for advancing the cutter toward the blank to seat the cutter therein to the proper depth; means whereby during the cutting operation the cutter is rotated on its own axis; a segment attached to said support; a reciprocable rack bar engaging said segment; a lever connected with said rack bar; an arm connected with said lever; a slide on which the lever is pivotally mounted, means for operating the slide to reciprocate the lever and rack bar; an arm attached to said lever, and a fixed cam engaged by said arm to vary the motion of said rack bar as it is reciprocated; whereby during the cutting operation the support is rocked to move the cutter on an arc longitudinally of the blank, whereby a varying helical groove is cut in the blank.

20. Mechanism for producing an actuating member having a varying spiral groove; comprising means for supporting a cylindrical blank for rotation on its axis opposite a cutter whose axis is perpendicular to a plane containing the axis of the blank; means for entering the cutter into the blank; means for simultaneously rotating the cutter into the blank to cut the blank and means for relatively moving the blank and cutter during the cutting operation so that the cutter operates on the blank on an arc in a plane perpendicular to the axis of the cutter and parallel with the longitudinal axis of the blank, said arc intersecting at two points a plane perpendicular to the plane containing the axis of the blank thereby producing a varying spiral groove in the blank.

21. Mechanism for producing an actuating member having a varying spiral groove; consisting in means for mounting a cylindrical blank so that it may be revolved on its axis; a cutter the axis of which is perpendicular to a plane containing the axis of the blank; means for producing a relative movement between the blank and the cutter while the cutter always lies in some plane parallel to the said plane containing the axis of the blank so that this relative movement produces a lateral movement of the cutter with varying speed on an arc with respect to the axis of the blank; means for rotating the cutter and decreasing the distance between the cutter and the blank whereby the cutter is caused to enter into the blank; and means for simultaneously rotating the blank into which the rotating cutter has been sunk after the cutter has been entered in the blank and while it is rotated, thereby producing in the blank a spiral groove of varying pitch and varying depth.

22. In mechanism for producing an actuating member having a varying spiral groove; means for mounting a cylindrical blank for rotation on its longitudinal axis; a cutter whose axis is perpendicular to a plane containing the axis of the blank; means for introducing the cutter into the blank; means for rotating the cutter on its axis to cut the blank; and means for producing during this cutting operation such relative movement between the cutter and the blank that the cutter while traversing with varying speed a plane parallel with the axis of the blank operates upon the blank on an arc extending through a plane parallel with the plane containing the axis of the blank; thereby producing in the blank a spiral groove which is deepest intermediate its ends and center, and which increases in pitch from the center toward each end thereof.

23. Apparatus for producing an actuating member having a varying spiral groove, comprising means for mounting a cylindrical blank for rotation on its longitudinal axis, means for rotating the blank; a rotatable cutter whose axis is perpendicular to a plane containing the axis of the blank; and means for producing during the cutting operation a variable ratio of relative movement between the cutter and the blank thereby producing a varying spiral groove in the blank.

24. In mechanism for producing an actuating member having a varying spiral groove; means for mounting a cylindrical blank for rotation on its longitudinal axis; a cutter whose axis is perpendicular to a plane containing the axis of the blank; means for rotating the cutter on its axis to cut the blank; means for entering the cutter into the blank; and means for thereafter producing a variable ratio of relative movement between the cutter and the blank thereby producing a varying spiral groove in the blank.

25. Apparatus for producing a spirally grooved actuating member, comprising means for mounting a blank for rotation on its axis, a rotatable cutter whose axis is substantially perpendicular to a plane containing the axis of the blank; and means for producing during the cutting operation movement of the cutter on an arc relative to the blank; said cutter in traversing such arc intersects at two points a plane extending through the axis of the blank and substantially perpendicular to the plane of the arc.

26. In mechanism for producing a spirally grooved actuating member; means for mounting a blank for rotation on its axis; a cutter whose axis is substantially perpendicular to a plane containing the axis of the blank; means for rotating the cutter; means for entering the cutter into the blank; and means for producing an arcuate movement of the cutter relative to the blank; said cutter in traversing such arc intersecting at two points a plane extending through the axis of the blank and approximately perpendicular to the plane of the arc.

27. Apparatus for producing an actuating member having a varying spiral groove; comprising means for supporting a cylindrical blank for rotation on its longitudinal axis, a rotatable cutter whose axis is perpendicular to a plane containing the axis of the blank; and means for moving the cutter during the cutting operation on an arc which intersects at two points a plane extending through the axis of the blank and perpendicular to the plane of the arc; thereby producing a spiral groove in the blank deepest at the points where the arc intersects said plane.

28. Apparatus for producing an actuating member having a varying spiral groove, comprising means for mounting a cylindrical blank for rotation on its longitudinal axis, a rotatable cutter whose axis is perpendicular to a plane containing the axis of the blank; and means for producing during the cutting operation an arcuate movement of the cutter relative to the blank; said cutter in traversing such arc intersecting at two points a plane extending through the axis of the blank and perpendicular to the plane of the arc thereby producing a varying spiral groove in the blank.

29. In mechanism for producing an actuating member having a varying spiral groove; means for mounting a cylindrical blank for rotation on its longitudinal axis; a cutter whose axis is perpendicular to a plane containing the axis of the blank; means for rotating the cutter on its axis to cut the blank; means for entering the cutter into the blank; and means for thereafter producing an arcuate movement of the cutter relative to the blank; said cutter in traversing such arc intersecting at two points a plane extending through the axis of the blank and perpendicular to the plane of the arc, thereby producing a varying spiral groove in the blank.

30. In mechanism for producing an actuating member having a varying spiral groove; means for supporting a cylindrical blank for rotation on its longitudinal axis; a cutter whose axis is perpendicular to a plane containing the axis of the blank; means for rotating the cutter on its axis to cut the blank; means for entering the cutter into the blank; and means for thereafter moving the cutter on an arc which intersects at two points a plane extending through the axis of the blank and perpendicular to the plane of the arc; thereby producing a varying spiral groove in the blank deepest at the points where the arc intersects said plane.

31. In a machine for cutting helical grooves; means for holding a blank; a rotatable cutter; and means for producing such a variable ratio of motion between the cutter and blank that the cutter traverses an arc extending longitudinally of the blank and cuts a helical groove in the blank of greatest angularity at center and varying in angularity between its center and each end thereof.

32. In a machine for cutting variable helical grooves in cylindric blanks; means for holding a blank, a cutter, means whereby the cutter is rotated, means for entering the cutter into the blank, and means for thereafter producing such a variable ratio of relative motion between the cutter and the blank during the cutting operation that a helical groove of greatest angularity at center and varying in angularity between its center and each end thereof is produced in the blank.

33. In a machine for cutting variable helical grooves in cylindric blanks; means for holding and axially rotating a blank, a rotatable tool holder, means whereby the holder is rotated; a cutter attached to said holder; means for advancing the holder toward the blank to cause the cutter to seat to the proper depth in the blank; and means for thereafter producing a variable ratio of relative motion between the cutter and the blank to cut a varying helical groove in the blank.

34. In a machine for cutting helical grooves in cylindric blanks; means for holding a blank; a cutter; means whereby the cutter is rotated; means for entering the cutter into the blank; and means for thereafter producing such a variable ratio of relative motion between the cutter and blank that the cutter is moved in an arc extending longitudinally of the cam blank, and in a plane to one side of and parallel with the axis of the blank, whereby a helical groove is cut in the blank, such groove being of greatest pitch at its central point and gradually decreasing in pitch toward each end thereof.

In testimony that I claim the foregoing as my own, I affix my signature.

DAVID E. ROSS.